3,077,453
CORROSION INHIBITION
Billy D. Oakes, Tulsa, Okla., assignor to The Dow Chemical Company, Midland, Mich., a corporation of Delaware
No Drawing. Filed Sept. 1, 1961, Ser. No. 135,432
4 Claims. (Cl. 252—147)

The present invention relates to the prevention of corrosion of metals in contact with acids. More particularly the present invention relates to corrosion inhibiting compositions containing acetylenic or nitrogen compounds and tin compounds.

Many compounds have been preposed to inhibit the corrosion of metals in contact with acids. These compounds and compositions containing these compounds have proved satisfactory in limited application. However, to date, no single composition has been found which is effective in preventing corrosion of metal in contact with all of the industrial acids in use today. Further, many of the inhibitors, excellent at low temperatures, are ineffective at temperatures above about 80° C.

It is therefore an object of the present invention to provide a new and useful composition for the prevention of corrosion of metals in contact with acids. It is a further object of the present invention to provide a corrosion inhibitor composition which will be effective at temperatures as high as 150° C., and further, which composition is effective over a longer period than heretofore thought possible. These and other objects will become apparent to those skilled in the art from the following description and claims.

It has now been found that the presence of the stannous ion in conjunction with the acetylenic or amine moiety of an organic compound effectively inhibits the corrosion of metal when such metal is in contact with aqueous acids. Thus, one can employ a stannous-ion-producing compound in combination with an acetylenic compound or in combination with an amine or both and obtain, when the inhibitor composition is mixed with an aqueous acid, a marked improvement in corrosion inhibition over that obtained employing any one of the ingredients alone or a combination of the ingredients without stannous ion. Good results have been obtained when the inhibitor composition contains stannous ion in the amounts of from as little as 2 percent by weight to about 60 percent by weight. The amount of stannous ion which in an aqueous acid composition imparts an improved effect is from about 0.008 percent by weight to about 0.32 percent by weight, and preferably from about 0.08 percent by weight to about 0.24 percent by weight based on the weight of the aqueous acid solution.

The stannous ion is conveniently incorporated in the inhibitor composition by employing such compounds, as for example, stannous chloride, stannous bromide, stannous sulfide, stannous oxide, their hydrates and the like.

The acetylenic compounds which are synergized by the presence of the stannous ion are the acetylenic alcohols and diols, such as for example, propargyl alcohol, methylbutynol, butynediol, 1-ethynylcyclohexanol, 3-methyl-1-nonyn-3-ol, 2-methyl-3-butyn-2-ol, and α-ethynyl 2,4,6-trimethylbenzyl alcohol. Thus, in general, acetylenic compounds having the general formula

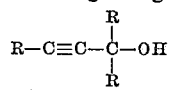

wherein each R represents an independently selected radical of the group consisting of hydrogen, lower alkyl, i.e., 1 to 4 carbon atoms, phenyl, substituted phenyl or hydroxy lower alkyl and the α-R's may be fused together to form a 5 or 6 membered ring.

The amines which are effectively synergized by the action of stannous ion, either alone or in combination with the acetylenic compound, are for example the mono, di and trialkyl amines having from 2 to 6 carbon atoms in each alkyl moiety as well as the 6 membered N-heterocyclic amines, i.e., the alkylpyridines and mixtures thereof. Such amines include ethylamine, diethylamine, triethylamine, propylamine, dipropylamine, tripropylamine, mono, di and tributylamine, mono, di and tripentylamine, mono, di and trihexylamine, as well as their isomers such as isopropylamine, tertiary-butylamine and the like, and the alkylpyridines having from 1 to 5 nuclear alkyl substituents per pyridine moiety, said alkyl substituents having from 1 to 12 carbon atoms, and preferably those having an average of 6 carbon atoms per pyridine moiety, such as a mixture of high-boiling tertiary-nitrogen-heterocyclic compounds having an equivalent weight of approximately 170 (Alkylpyridine HB, a product of Union Carbide and Carbon Co.).

The following examples are illustrative of the present invention but are not to be construed as limiting.

Examples 1–24

Tests were run with mixtures of various acetylenic compounds and stannous chloride as hydrochloric acid inhibitors employing API N80 tubing (1″ wide quarter segment of 2.375″ outside diameter pipe, wall thickness of 0.187″) and AISI 1010 coupons (2.75″ x 1.0″ x 0.12″). The acid employed was aqueous 15 percent hydrochloric acid and the test coupon was left in the acid for 16 hours except where indicated. The results of such tests are tabulated below:

| Ex. No. | Concentration of Acetylenic or Alkylpyridines in Inhibitor (percent by volume) | Concentration Stannous Ion [1] (percent by weight) | Metal | Temp., (° F.) | Corrosion Rate (lbs./ft.²/day) |
|---|---|---|---|---|---|
| 1 | none | 0.32 | API N80 | 175 | Reaction rate same as for raw (uninhibited) acid. |
| 2 | do | 0.32 | AISI 1010 | 175 | Do. |
| 3 | 0.4 methylbutynol (Coded MB) | 0 | 1010 | 175 | 0.64. |
| 4 | 0.4 MB | 0.32 | 1010 | 175 | 0.30. |
| 5 | 0.4 propargyl alcohol (Coded PA) | 0 | N80 | 200 | >1.0. |
| 6 | 0.4 PA | 0.32 | N80 | 200 | 0.19. |
| 7 | 0.4 butynediol (Coded BD) | 0 | 1010 | 175 | 0.56. |
| 8 | 0.4 BD | 0.32 | 1010 | 175 | 0.025. |
| 9 | 0.4 ethynycyclohexanol (Coded ECH) | 0 | 1010 | 175 | >1.0. |
| 10 | 0.4 ECH | 0.32 | 1010 | 175 | 0.21. |
| 11 | 0.8 1:9 mixture of MB and alkylpyridines HB (Coded HB) | 0 | N80 | 175 | 0.15. |
| 12 | 0.8 above mixture | 0.32 | N80 | 175 | 0.039. |
| 13 | 0.4 1:1 mixture of PA and HB | 0 | N80 | 200 | 0.40. |
| 14 | do | 0.32 | N80 | 200 | 0.025. |
| 15 | 0.4 1:1 mixture of BD and HB | 0 | 1010 | 175 | 0.013. |

See footnote at end of table.

| Ex. No. | Concentration of Acetylenic or Alkylpyridines in Inhibitor (percent by volume) | Concentration Stannous Ion [1] (percent by weight) | Metal | Temp., (° F.) | Corrosion Rate (lbs./ft.²/day) |
|---|---|---|---|---|---|
| 16 | ---do--- | 0.32 | 1010 | 175 | 0.0050 |
| 17 | 0.6 1:1 mixture of PA and HB | 0 | N80 | 250 | 0.402 [2] |
| 18 | ---do--- | 0.16 | N80 | 250 | 0.043 [2] |
| 19 | ---do--- | 0 | N80 | 250 | 2.5 [3] |
| 20 | ---do--- | 0.16 | N80 | 250 | 0.80 [3] |
| 21 | 1.5 HB | 0 | N80 | 200 | 0.050 [3] |
| 22 | 1.5 HB | 0.16 | N80 | 200 | 0.060 [3] |
| 23 | 1.5 HB | 0 | N80 | 200 | 0.220 |
| 24 | 1.5 HB | 0.16 | N80 | 200 | 0.097 |

[1] Stannous ion was added as stannous chloride, $SnCl_2 \cdot 2H_2O$.
[2] Length of test was 4 hours.
[3] Length of test was 6 hours.

*Examples 25–28*

Other tests were run to determine the effect of various stannous compounds to supply the stannous ion in the synergistic inhibitor mixtures.

Acid _____ 150 ml. 15% hydrochloric acid
Temperature __ 175° F.
Length of test_ 16 hours
Metal _____ AISI 1010 coupons (2.75" x 1.0" x 0.12")

| Ex. No. | Concentration Acetylenic Compound (percent by volume) | Concentration Stannous (percent by weight) | Corrosion Rate (lbs./ft.²/day) |
|---|---|---|---|
| 25 | 0.4 methyl butynol (MB) | | 0.64 |
| 26 | 0.4 MB | 0.2 Sn++ as $SnCl_2 \cdot 2H_2O$ | 0.30 |
| 27 | 0.4 MB | 0.2 Sn++ as SnO | 0.28 |
| 28 | 0.4 MB | 0.2 Sn++++ as $SnCl_4 \cdot 5H_2O$ | 0.67 |

It is to be observed that the stannic ion does not impart any visible effect on the corrosion rate.

*Examples 29–36*

Corrosion rate determinations were made to determine the concentration of stannous ion required, and the effect of the various concentrations of stannous ion in the inhibitor mixture. In each test the acid contained 0.4 percent by volume of a 1:1 mixture, by volume, of propargyl alcohol and Alkylpyridines HB (a product of Union Carbide and Carbon Co.).

Acid _____ 100 ml. 15% hydrochloric acid
Temperature _____ 200° F.
Length of test _____ 16 hours
Metal _____ API N80 tubing

| Ex. No. | Concentration Stannous [1] Ion (percent by weight) | Corrosion Rate, lbs./ft.²/day |
|---|---|---|
| 29 | | 0.40 |
| 30 | 0.008 | 0.29 |
| 31 | 0.016 | 0.098 |
| 32 | 0.032 | 0.062 |
| 33 | 0.08 | 0.034 |
| 34 | 0.16 | 0.028 |
| 35 | 0.24 | 0.023 |
| 36 | 0.32 | 0.025 |

[1] Added as $SnCl_2 \cdot 2H_2O$.

*Examples 37 to 40*

Corrosion tests were made to determine the effectiveness of the inhibitor systems on metals commonly encountered in both oil well treating and industrial cleaning operations.

Acid _____ 150 ml. 5% hydrochloric acid
Length of test _____ 6 hours

| Ex. No. | Metal | Concentration Inhibitor (percent by volume) | Concentration Stannous Ion (percent by weight) | Temp. (° F.) | Corrosion Rate (lbs./ft.²/day) |
|---|---|---|---|---|---|
| 37 | Cast Iron | 0.4 1:1 mixture PA+HB [1] | | 150 | 0.172 |
| 38 | ---do--- | ---do--- | 0.32 | 150 | 0.087 |
| 39 | SA83A | ---do--- | | 175 | 0.0078 |
| 40 | SA83A | ---do--- | 0.32 | 175 | 0.0066 |

[1] PA—Propargyl alcohol; HB—Alkylpyridines HB.

*Examples 41 to 52*

The effect of the inhibitor system of the instant invention was determined in acids other than hydrochloric acid employing propargyl alcohol; propargyl alcohol and stannous ion; and, propargyl alcohol, Alkylpyridines HB and stannous ion containing inhibitor compositions.

Volume of acid_ 150 ml.
Temperature __ 150° F.
Length of test _ 16 hours
Metal _____ AISI 1010 coupons (2.75 x 1.0 x 0.12")

| Ex. No. | Acid Media, Aqueous (percent by volume) | Concentration Inhibitor (percent by volume) | Concentration Stannous Ion [1] (percent by weight) | Corrosion Rate, (lbs./ft.²/day) |
|---|---|---|---|---|
| 41 | 5 $H_2SO_4$ | 0.4 PA | 0 | 0.91 |
| 42 | 5 $H_2SO_4$ | 0.4 PA | 0.16 | 0.0047 |
| 43 | 5 $H_2SO_4$ | 0.4 1:1 mixture of PA and HB | 0 | 0.15 |
| 44 | 5 $H_2SO_4$ | ---do--- | 0.16 | 0.0004 |
| 45 | 5 $H_3PO_4$ | 0.4 PA | 0 | 0.14 |
| 46 | 5 $H_3PO_4$ | 0.4 PA | 0.16 | 0.0055 |
| 47 | 5 $H_3PO_4$ | 0.4 1:1 mixture of PA and HB | 0 | 0.14 |
| 48 | 5 $H_3PO_4$ | ---do--- | 0.16 | 0.0009 |
| 49 | 5 $CH_3COOH$ | 0.4 PA | 0 | 0.10 |
| 50 | 5 $CH_3COOH$ | 0.4 PA | 0.16 | 0.0004 |
| 51 | 5 $CH_3COOH$ | 0.4 1:1 mixture of PA and HB | 0 | 0.067 |
| 52 | 5 $CH_3COOH$ | ---do--- | 0.16 | 0.0003 |

[1] Added as $SnCl_2 \cdot 2H_2O$.

*Examples 53 to 63*

Corrosion tests were made to determine the effect of other amines in the inhibitor compositions of the present invention. The tests were the same as set forth in Examples 1 through 24 and the results are set forth below:

Acid _____150 ml. aqueous 15% hydrochloric acid
Length of test __16 hours
Temperature ___175° C.
Metal _____AISI 1010 coupons EFFECT OF THE ADDITION OF STANNOUS ION TO VARIOUS AMINE AND AMINE-PROPARGYL ALCOHOL MIXTURES

| Ex. No. | Concentration Amine (percent by volume) | Concentration Propargyl Alcohol (percent by volume) | Concentration Stannous Ion [1] (percent by weight) | Corrosion Rate (lbs./ft.²/day) |
|---|---|---|---|---|
| 53 | 0.4 ethanolamine | | | >1.0 |
| 54 | ----do---- | | 0.32 | 0.96 |
| 55 | 0.2 ethanolamine | 0.2 | | >1.0 |
| 56 | ----do---- | 0.2 | 0.32 | 0.83 |
| 57 | 0.4 cyclohexylamine | | | >1.0 |
| 58 | 0.2 cyclohexylamine | 0.2 | | >1.0 |
| 59 | ----do---- | 0.2 | 0.32 | 0.89 |
| 60 | 0.4 1,2-propanediamine | | | >1.0 |
| 61 | ----do---- | | 0.32 | 0.57 |
| 62 | 0.2 1,2-propanediamine | 0.2 | | >1.0 |
| 63 | ----do---- | 0.2 | 0.32 | 0.79 |

[1] Stannous ion was added as stannous chloride, $SnCl_2 \cdot 2H_2O$.

This application is a continuation-in-part of application Serial No. 736,707, filed May 21, 1958, now abandoned.

I claim:
1. A corrosion inhibitor composition consisting essentially of from 0 to 98 parts by weight of an acetylenic alcohol having the formula

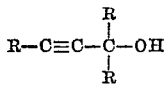

wherein each R represents a member selected from the group consisting of hydrogen, lower alkyl, phenyl, cycloalkyl and hydroxyalkyl and wherein the α-R's may be joined together to form a ring, from 2 to 60 parts by weight of a compound capable of providing a stannous ion, and from 98 to 0 parts by weight of an amine per 100 parts of inhibitor composition, said amine being selected from the group consisting of alkylamines, dialkylamines and trialkylamines having from 2 to 6 carbon atoms in each alkyl moiety and alkyl pyridines having from 1 to 5 alkyl substituents and from 1 to 12 carbon atoms in each substituent.

2. The corrosion inhibitor composition as set forth in claim 1 wherein said acetylenic compound is employed in from 40 to 98 parts by weight and said stannous compound is employed in from 60 to 2 parts by weight respectively.

3. The corrision inhibitor composition as set forth in claim 1 wherein said stannous compound is employed in from 40 to 2 parts by weight and said amine is employed in from 60 to 98 parts by weight.

4. A composition consisting essentially of an aqueous acid and from 0.008 to 0.32 part by weight of a corrosion inhibitor composition as set forth in claim 1 per 100 parts of aqueous acid.

References Cited in the file of this patent
UNITED STATES PATENTS

| | | |
|---|---|---|
| 1,678,776 | Gravel et al. | July 31, 1928 |
| 2,053,024 | Dreyfus | Sept. 1, 1936 |
| 2,097,847 | Strauch | Nov. 2, 1937 |
| 2,472,400 | Bond et al. | June 7, 1949 |
| 2,806,067 | Monroe et al. | Sept. 10, 1957 |
| 2,814,593 | Beiswanger et al. | Nov. 26, 1957 |
| 2,846,294 | Patterson et al. | Aug. 5, 1958 |
| 2,913,408 | Pumpelly et al. | Nov. 19, 1959 |
| 2,955,083 | Levin | Oct. 4, 1960 |

FOREIGN PATENTS

| | | |
|---|---|---|
| 235,291 | Switzerland | Apr. 3, 1945 |